United States Patent [19]

Kyle

[11] Patent Number: 4,914,799
[45] Date of Patent: Apr. 10, 1990

[54] METHOD OF FORMING, ASSEMBLING, AND FILLING A VISCOUS DAMPER

[75] Inventor: Robert J. Kyle, Battle Creek, Mich.

[73] Assignee: Eaton Corporation, Cleveland, Ohio

[21] Appl. No.: 256,816

[22] Filed: Oct. 12, 1988

[51] Int. Cl.⁴ ............................................. B23P 11/00
[52] U.S. Cl. ...................................... 29/429; 29/450;
   29/463; 267/140.1; 192/106.2
[58] Field of Search ........................ 29/463, 429, 450;
   192/160.1, 160.2; 267/140.1

[56] References Cited

U.S. PATENT DOCUMENTS

| | | | |
|---|---|---|---|
| 4,020,937 | 5/1977 | Winter | 29/463 X |
| 4,601,676 | 7/1986 | Tojima et al. | 192/106.2 X |
| 4,608,883 | 9/1986 | Bopp | 74/574 |
| 4,782,932 | 11/1988 | Janson | 192/106.1 X |
| 4,782,936 | 11/1988 | Bopp | 192/106.2 |
| 4,811,474 | 3/1989 | Maucher et al. | 29/446 |

Primary Examiner—Timothy V. Eley
Assistant Examiner—Frances Chin
Attorney, Agent, or Firm—P. S. Rulon

[57] ABSTRACT

A clutch plate assembly (24) for a vehicle driveline includes a spring damping mechanism disposed in parallel with a viscous shear damper mechanism (30) for damping spring recoil. The spring damping mechanism includes a set of pairs of relatively high rate helical compression springs (34,36) for transmitting torque and attenuating torsionals when a transmission input shaft (22) is connected to a load and a set of relatively low rate helical compression springs (38) connected in series with the high rate springs (34,36) for attenuating torsionals when the shaft (22) is not connected to a load. The viscous damper mechanism includes an annular housing (48) having first and second radially extending sidewalls (52,54) defining a compartment (48a) having a clutch assembly (50) disposed therein for viscous clutching coaction via a viscous shear oil. An inner member (58) of the clutch assembly (50) includes a dynamic seal assembly (66 or 72) molded integral therewith for sealing the inner extent of the compartment (48a). The inner extent of the housing includes a plurality of fasteners (56e) structurally interconnecting the inner extent of the sidewalls (52,54) to prevent relative axial movement of the sidewalls due to centrifugal effects. The housing sidewalls (52,54), and the clutch and seal assemblies are formed to facilitate a method for readily assembling and accurately filling the damper with viscous shear oil.

6 Claims, 3 Drawing Sheets

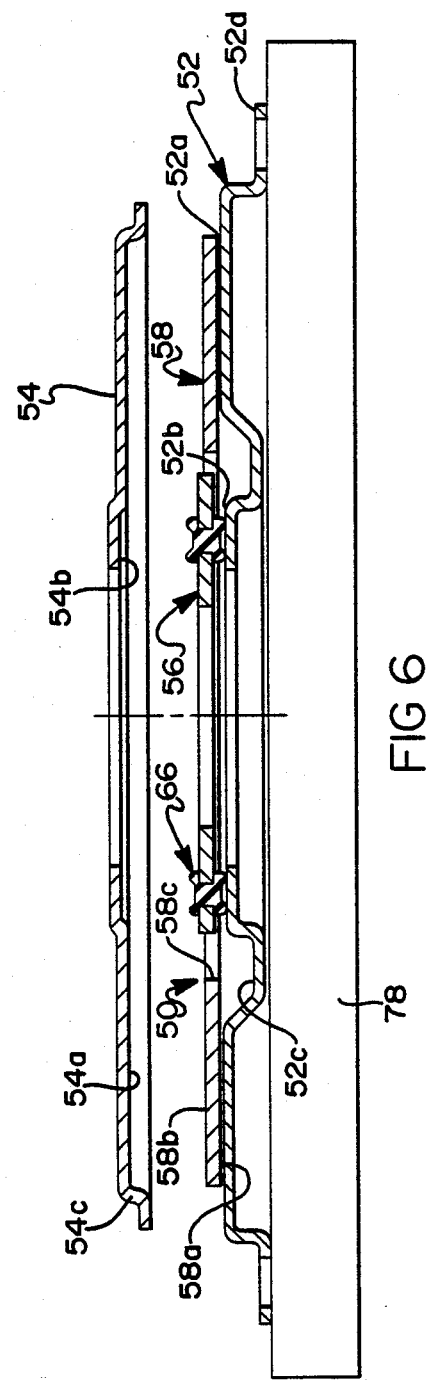
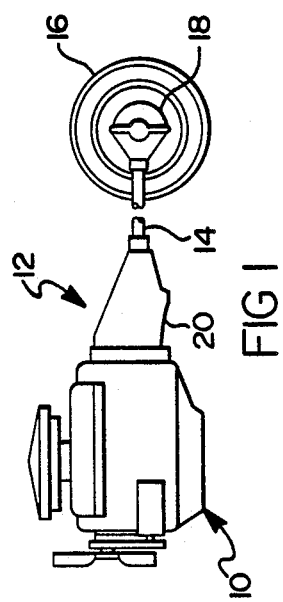

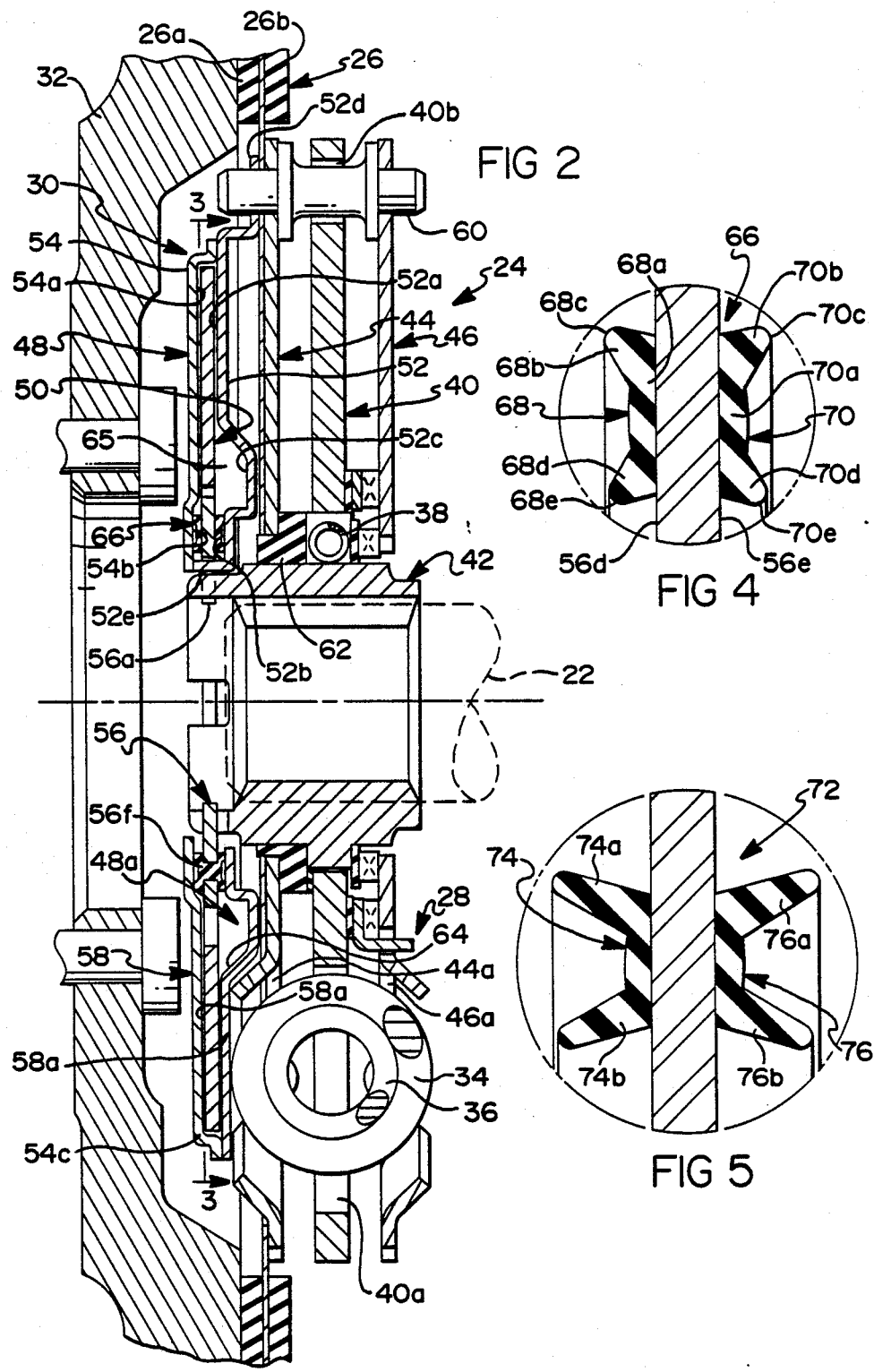

METHOD OF FORMING, ASSEMBLING, AND FILLING A VISCOUS DAMPER

CROSS-REFERENCE TO RELATED APPLICATIONS

The invention of this aplications relates to U.S. Application Ser. No. 793,802, filed Nov. 1, 1985; to U.S. Application Ser. No. 256,690, filed Oct. 12, 1988; and to U.S. Application Ser. No. 257,258, filed Oct. 12, 1988. These applications are asigned to the asignee of this applicatiion.

FIELD OF THE INVENTION

This invention relates to torsional vibration damping mechanisms. More specifically, this invention relates to a viscous damper module for damping the rate of spring recoil in a torsion vibration damping mechanism.

BACKGROUND OF THE INVENTION

Torsional vibration damping mechanisms have long been used to reduce the adverse effects of torsional vibrations or fluctuating torques in vehicle drivelines. Such torsional vibrations or fluctuating torques, hereinafter referred to as torsionals, emanate primarily from engine power pulses and torque spikes, and from abrupt changes in driveline torque due primarily to rapid engine acceleration/deceleration and transmission ratio changes.

Most known, prior art torsional vibration damping mechanisms have employed springs disposed in parallel with a mechanical friction device. A well known and basic type of such mechanism has comprised plate like members mounted for limited relative rotation, a set of helical compression springs interconnecting the members and a mechanical friction device responsive to relative rotation of the members. Driveline torque is normally transmitted by the helical springs and flexing of the springs attenuates or reduces the potential amplitude of the driveline torsionals. The mechanical friction device dampens or reduces the rate of spring recoil. When the amplitude of the torsionals is less than the breakaway torque of the friction device, spring flexing does not occur and the torsionals are transmitted without benefit of attenuation.

It is also known to employ flat spiral wound or helical compression springs in parallel with a visous coupling or damper mechanism, as may be seen by reference to U.S. Pat. Nos. 4,608,883 and 4,601,676, respectively, which are incorporated herein by reference. Since a liquid is the clutching medium within a viscous damper, the problem of breakaway torque associated with mechanical friction devices is in theory eliminated. However, such viscous dampers have been difficult to fit into the limited space available in vehicle drivelines and when reduced to sizes that fit in the limited space available, they have been difficult to assemble and properly fill with viscous shear oil, and they have required costly and/or bulky dynamic seal to eliminate seal drag torque.

SUMMARY OF THE INVENTION

An object of this invention is to provide a viscous coupling or damper which is readily assembled and accurately filled with viscous shear oil during assembly.

Another object of this invention is to provide a method for readily assembling and accurately filling a viscous coupling or damper with viscous shear oil.

According to a feature of the invention, a method is employed for assembling and filling a viscous damper including annular housing and clutch assemblies adapted for relative rotation about a common axis. The housing assembly includes first and second sidewalls defining an interior compartment containing radially inner and outer members of the clutch assembly. The members are drivingly interconnected and are axially movable relative to each other. The compartment includes a radially outer portion defining a viscous shear chamber formed by closely spaced apart axially facing annular flat shear surfaces of the housing assembly sidewalls and the clutch assembly outer member, and a reservoir chamber disposed radially inward of the shear chamber and having a principle volume formed by an annular bulge in at least the first sidewall. The clutch assembly has at least one opening therethrough adjacent the annular bulge. The inner member includes axially oppositely facing surfaces having seals affixed thereto and extending axially therefrom into dynamic sealing relation with flat annular seal surfaces having an axial spacing therebetween greater than the total axial spacing between the sidewall viscous shear surfaces and defined by portions of the sidewalls radially inward of the reservoir. The method of assembling and filling being characterized by: positioning the first sidewall on a support with the shear and seal surfaces thereof facing upward and in a horizontal plane; positioning the clutch assembly inner member with one of the seals resting on the first sidewall shear surface and the outer member with one of the shear surfaces thereof resting on the first sidewall shear surface; injecting a predetermined volume of viscous shear liquid through the opening in the clutch assembly in excess to the volume of the annular bulge and less than an amount capable of overflowing the upward surfaces of the inner and outer members; positioning the second sidewall over the clutch assembly with the seal surface thereof resting on the other dynamic seal of the inner member and with the axially extending spacer flange seated on a radially outer extent of the first sidewall shear surface; and sealingly securing the spacer flange to the annular surface.

BRIEF DESCRIPTION OF THE DRAWINGS

The torsional damping mechanism of the present invention is shown in the accompanying drawings in which:

FIG. 1 is a schematic view of a motor vehicle driveline;

FIG. 2 is a detailed, sectional view of the mechanism looking along line 2—2 of FIG. 3;

FIG. 4 is an enlarged sectional view of a portion of a seal in the mechanism;

FIG. 5 is an enlarged sectional view of a portion of an alternative seal; and

FIG. 6 is a sectional view of the viscous damper illustrating a method of assembling and filling the damper with a viscous shear liquid.

DETAILED DESCRIPTION OF THE DRAWINGS

Figure 3:
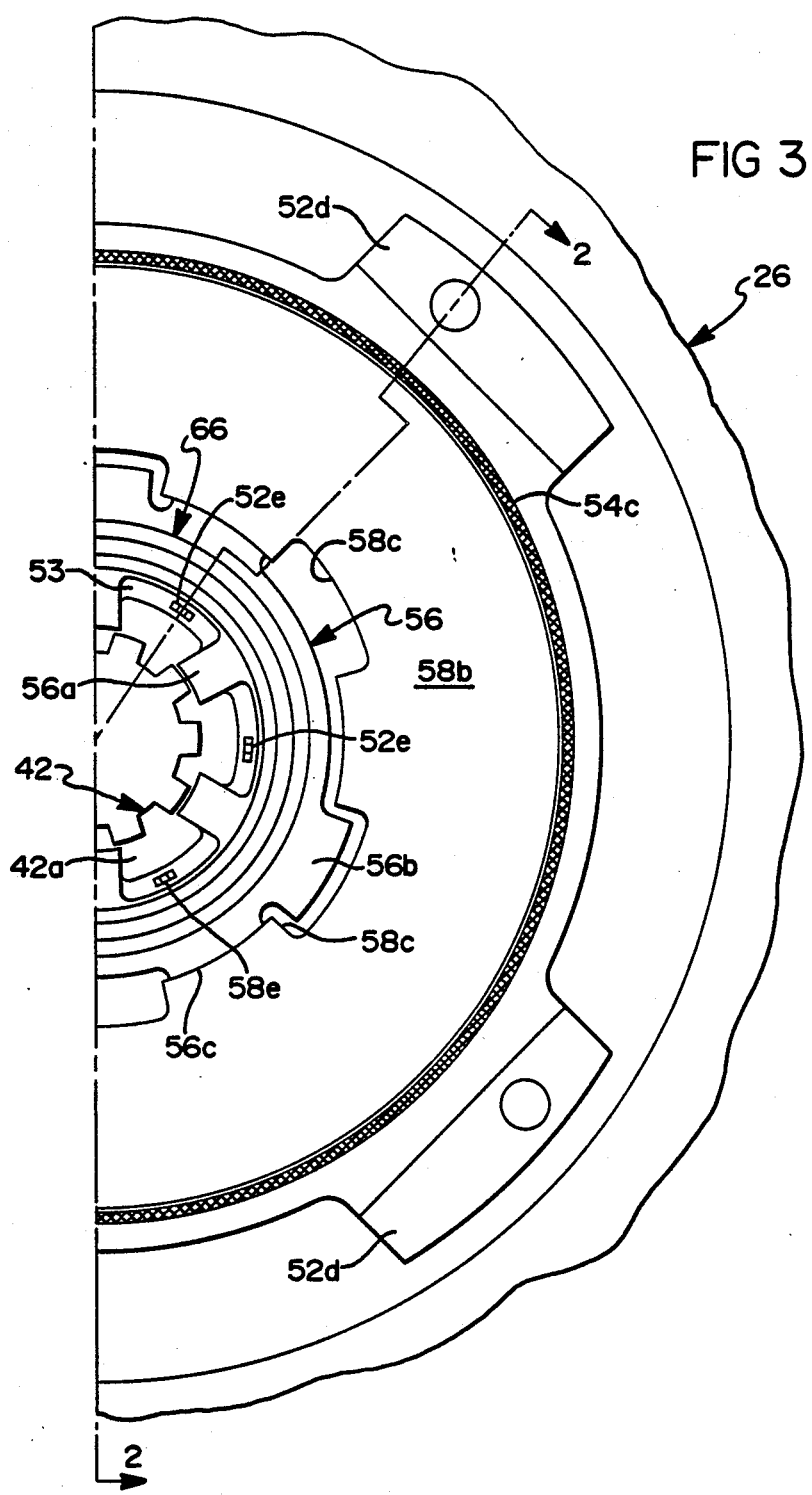
FIG. 3 is a detailed, sectional view of a viscous damper of the mechanism looking along line 3—3 of FIG. 2.

The motor vehicle driveline seen schematically in FIG. 1 includes a prime mover 10 and a transmission 12 having an output shaft 14 drivingly connected to a load such as a ground engaging wheel 16 via a differential gear assembly 18 for rear and/or front axles of a vehicle. Prime mover 10 is preferably of the internal, periodic combustion type but may be any type of power plant having torque characteristics that are improved by a torsional vibration damping mechanism. Transmission 12 includes a housing 20 containing a plurality of unshown, constant mesh ratio gears or ratio change mechanisms driven by a transmission input shaft or drive 22 partially shown in FIG. 2. Well-known ratio change devices or clutches within the transmission are employed to selectively (i.e., manually or automatically) put the transmission in a neutral position wherein the input shaft 22 is not connected to the load or in-gear positions wherein the input shaft is connected to the load.

Looking now at FIGS. 2 and 3, therein is illustrated an annular clutch plate assembly 24 disposed for rotation about the axis of transmission input shaft 22. Clutch plate assembly 24 includes a partially shown annular friction ring 26 in driving relation with shaft 22 via a spring damping mechanism 28 positioned radially between the friction ring and shaft 22 and disposed in parallel with a viscous shear damper mechanism 30. The friction ring includes oppositely facing friction surfaces 26a,26b frictionally connectable to a partially shown engine flywheel 32 in response to selective axial movement of an unshown pressure plate in well-known manner.

The spring damper mechanism 28, which is well-known in the prior art, includes, a first set of pairs of springs 34,36 for transmitting full driveline torque, a set of gear anti-rattle springs 38, an intermediate member 40, a hub 42 slidably splined to drive 22, and a support structure including annular side plates 44,46. The viscous damper mechanism 30 or module includes annular housing and clutch assemblies 48,50. Housing assembly 48 includes first and second radially extending sidewalls 52,54 and clutch assembly 50 includes radially inner and outer members 56,58. The sidewalls define an annular radially extending compartment 48a closed at its radially outer extent, open at its radially inner extent and having the clutch assembly inner and outer members disposed therein. Side plates 44,46 of the support structure are rigidly secured together by a plurality of pins 60. The pins also rigidly secure friction ring 26 and viscous damper housing assembly 48 to the support structure. The ends of the pins are peened over when assembly is complete. Intermediate member 40 includes a plurality of circumferentially spaced apart openings 40a each receiving a pair of springs 34,36. The springs are also received by an equal number of pairs of circumferentially spaced apart openings 44a,46a is side plates 44,46. Radially extending ends of openings 40a,44a,46a react against the springs and connect the spring sets in series. Side plate 44 is journaled on hub 42 by a plastic bushing 62, intermediate member 40 is loosely splined to hub 42 in the circumferential direction. Anti-rattle springs 38 resist the free play between the unshown splines of member 40 and hub 42. Pins 60 pass through arcuate, circumferentially extending slots 40b in intermediate member 40 to allow friction ring 26, side plates 44,46 and viscous damper housing assembly 48 to rotate as a unit relative to intermediate member 40 and hub 42 in response to flexing of the springs 34,36,38.

The viscous damper inner clutch member 56 includes splines 56a which mate with splines 42a of the hub, whereby a given relative rotation between friction ring 26 and hub 42 provides an equal relative rotation between viscous damper housing assembly 48 and inner clutch member 56. Housing assembly 48 and clutch assembly 50 define closely spaced apart shear surfaces which are in clutching coaction via viscous shear liquid therebetween. The viscous shear liquid is of high viscosity and is preferably a silicone oil, for example dimethyl polysiloxane. The actual viscosity depends on driveline application, area and spacing of the housing and clutch surfaces, mean radius of the surface areas, etc.

Looking now at viscous damper mechanism 30 in greater detail, annular housing and clutch assemblies 48,50 are formed of stampings and therefore are relatively inexpensive to manufacture since they require little or no machining. Further, damping mechanism 30 is designed to facilitate installation in a limited available space, rapid and accurate assembly in production, and rapid and accurate filling with viscous shear liquid during assembly.

With respect to housing assembly 48, first sidewall 52 includes a radially outer portion defining a flat, annular shear surface 52a, a radially inner portion defining a flat, annular seal surface 52b, an annular bulge 52c, and a plurality of tabs or feet 52d secured to pins 60 as previously mentioned. First sidewall 52 also includes a plurality of axially extending, circumferentially spaced apart tabs or fingers 52e explained further hereinafter. Sidewall 54 includes a radially outer portion defining a flat, annular shear surface 54a, a radially inner portion defining a flat, annular seal surface 54b, and an annular axially extending spacer flange 54c sealingly secured to a radially outer extent of shear surface 52a and having an axial length defining the axial distance between shear surfaces 52a,54a.

With respect of clutch assembly 50, outer clutch member 58 includes axially oppositely facing, flat, annular shear surfaces 58a,58b which are closely spaced from the sidewall shear surfaces 52a,54a to form a viscous shear chamber 64, generally bounded in the radial direction by spacer flange 54c and the radially outer periphery of annular bulge 52c. The remainder of compartment 48a defines a reservoir chamber 65. The inner periphery of outer member 58 is drivingly connected to the outer periphery of inner member 56 via tabs 56b which are received by half of recesses 58c. Herein, the arcuate length of recesses 58c is greater than that of tabs 56b to allow rotational free play or lost motion therebetween. Alternatively, the free play may be deleted; however, the mating of the tabs and recesses preferably allows axial movement of the members relative to each other for purposes explained hereinafter. Inner clutch member 56 includes, in addition to splines or tabs 56a,56b, a plurality of arcuate surfaces 56c of equal radius journaling the outer member thereon and a dynamic face seal assembly 66 integral with the inner member. The seal assembly is partially shown enlarged in FIG. 4. Dynamic seal, as used herein, means a seal having a portion in sealing relation with a relatively movable surface.

The seal assembly includes symmetrical face seals 68,70 each having a base portion 68a,70a sealingly affixed to axially oppositely facing surfaces 56d,56e of the inner clutch member, an axially and radially inwardly extending primary seal portion 68b,70b terminating in a lip 68c,70c in dynamic sealing contact with sidewall seal surface 52b,54b, and an axially and radially inwardly extending exclusion seal portion 68d,70d terminating in a lip 68e,70e also in dynamic sealing contact with seal surface 52b,54b. The bases of seals 68,70 are preferably, but not necessarily, joined by extrusion of the elastomeric material through a plurality of openings 56f in the clutch inner member during the molding process. Primary seal portions 68b,70b prevent egress or leakage of fluid from housing compartment 48a of the damper mechanism. Exclusion seal portions 68d,70d prevent ingress of abrasive contaminants to the lips of the primary seals when the damper is used in relatively dry environments or of pressurized fluid when the damper is used in, for example, a torque converter housing. When the exclusion seals are unlubricated, their axial length is preferably less than that of the primary seals, to reduce seal drag torque and wear.

Further with respect to dynamic sealing of viscous damper and particularly a damper housing having relatively thin sidewalls, such as sidewalls 52,54, it has been found that the sidewalls separate axially due to centrifugal effects, thereby increasing the need for greater minimum amounts of initial or static seal compression to ensure sealing as the housing separates due to centrifugal effects. Such greater minimum seal compression increases seal drag torque at low rotational speeds and, in combination with seal compression added by manufacturing tolerance can result in excessively high seal drag torque, reduced seal life, and poor performance of the spring and viscous damper. Axial separation of the housing sidewalls is prevented and manufacturing tolerances are reduced, particularly in the area of seal surfaces 52i b,54b, by structurally connecting the radially inner extent of the sidewalls together by a plurality of circumferentially spaced apart fasteners or fingers 52e defined by tabs extending axially from sidewall 52 and secured to sidewall 54 by known means such as welding. The tabs extend through circumferentially extending openings 53 between splines 42a,56a of hub 42 and inner clutch member 56.

FIG. 5 illustrates an enlarged cross-section of a portion of an alternative molded seal assembly 72 including face seals 74,76 each having extended primary and exclusion seal portions 74a,7b, and 76a,76b to further reduce seal drag torque. Molded seal assemblies 66 and 72 simplify assembly of the damper mechanism since they are intergral with the clutch assembly and therefore are installed and properly positioned in one operational step with the clutch assembly. The molded seal assemblies are also axially compact while still being very flexible in the axial direction; hence, they reduce the axial space necessary to provide reliable sealing while at the same time reducing the effects of manufacturing tolerances which substantially vary seal compression and may dramatically increase seal drag torque. Further, the feature of an exclusion seal also protects the primary seal from early or premature failure due to abrasive contaminants.

Looking now at FIG. 6, therein is illustrated a method of assembling and rapidly filling damper mechanism 30 with a predetermined volume of silicone oil sufficient to ensure that thermal expansion of the oil does not over fill compartment 48a when the compartment volume is a minimum due to manufacturing tolerances and the oil volume is a maximum due to measuring tolerances, and to ensure a full fill of the shear chamber 64 when the shear volume is a maximum due to manufacturing tolerances and the oil volume is a minimum due to measuring tolerances.

Assembling and filling include positioning sidewall 52 of housing 48 on a support 78 with shear and seal surfaces 52a,52b facing upward and in a horizontal plane. Clutch assembly 50 is then positioned over sidewall 52 with seal 70 of seal assembly 66 resting on seal surface 52b and outer member shear surface 58a resting on sidewall shear surface 52a, thereby defining a trapped volume excessible via openings 58c between the inner and outer clutch members. This trapped volume, by design, has a capacity sufficient to receive the above mentioned predetermined volume of silicone oil for all tolerance conditions mentioned above without overflowing the upper surfaces 56c,58b of inner and outer members 56,58. The silicone is readily injected into the trapped volume through openings 58c which are not receiving one of the splines or tabs 56b of the inner member. Sidewall 54 is then positioned with spacer flange 54c seated on a radially outer extent of shear surface 52a. The interface of the spacer flange and shear surface are then sealingly secured together by known methods. Since the silicone oil, contained in the trapped volume, is spaced a substantial distance from spacer flange 54c, any of several rapid welding methods may be used, e.g., resistance or laser welding.

A preferred embodiment of the invention has been disclose for illustrative purposes. Many variations and modifications of the preferred embodiment are believed to be within the spirit of the invention. The following claims are intended to cover the inventive portions of the preferred embodiment and variations and modifications within the spirit of the invention.

What is claimed is:

1. A method of assembling and filling a viscous damper including annular housing and clutch assemblies adapted for relative rotation about a common axis; the housing assembly including first and second sidewalls defining an interior compartment containing drivingly interconnected radially inner and outer portions of the clutch assembly, the compartment including a radially outer portion defining a viscous shear chamber formed by closely spaced apart axially facing annular flat shear surfaces of the sidewalls and the outer portion, and a reservoir chamber disposed radially inward of the shear chamber and having a principle volume formed by an annular bulge in at least the first sidewall; the clutch assembly having at least one opening therethrough, the inner portion including an axially facing surface having a face seal affixed thereto and extending axially therefrom into dynamic sealing relation with a flat annular seal surface defined by a portion of the first sidewall radially inward of the annular bulge; the method comprising:

positioning the first sidewall on a support with the shear and seal surfaces thereof facing upward and in a horizontal plane;

positioning the clutch assembly inner portion with the seal resting on the first sidewall seal surface and the outer portion with one of the shear surfaces thereof axially facing the first sidewall shear surfaces;

injecting a predetermined volume of viscous shear liquid through the opening in the clutch assembly in excess to the volume of the annular bulge and less than an amount capable of overflowing the upward surfaces of the inner and outer portions;

positioning the second sidewall over the clutch assembly with a spacer sealingly secured to one of the sidewalls, axially spacing the sidewall shear surfaces apart and defining a radially outer extent of the viscous shear chamber; and sealingly securing the spacer to the other sidewall.

2. The method of claim 1, comprising forming the clutch assembly inner and outer portions of inner and outer members axially movable relative to each other to allow the one shear surface of the outer member to rest on the shear surface of the first sidewall when positioning the clutch assembly.

3. The method of claim 2, comprising forming the drivingly interconnected inner and outer members with a lost motion allowing limited relative rotation therebetween.

4. A method of assembling and filling a viscous damper annular housing and clutch assemblies adapted for relative rotation about a common axis; the housing assembly including first and second sidewalls defining an interior compartment containing radially inner and outer members of the clutch assembly, means drivingly interconnecting the members and allowing relative axial movement therebetween; the compartment including a radially outer portion defining a viscous shear chamber formed by closely spaced apart axially facing annular flat shear surfaces of the sidewalls and the outer member, and a reservoir chamber disposed radially inward of the shear chamber and having a principle volume formed by an annular bulge in at least the first sidewall; the clutch assembly having at least one opening therethrough adjacent the annular bulge, the inner member including axially oppositely facing surfaces having face seals affixed thereto and extending axially therefrom into dynamic sealing relation with flat annular seal surfaces having an axial spacing therebetween greater than axial spacing between the sidewall shear surfaces and defined by portions of the sidewalls radially inward of the reservoir; the method comprising:

positioning the first sidewall on a support with the shear and seal surfaces thereof facing upward and in a horizontal plane;

positioning the clutch assembly inner member with one of seals resting on the first sidewall seal surface and the outer member with one of the shear surfaces thereof resting on the first sidewall shear surface;

injecting a predetermined volume of viscous shear liquid through the opening in the clutch assembly in excess to the volume of the annular bulge and less than an amount capable of overflowing the upward surfaces of the inner and outer members;

positioning the second sidewall over the clutch assembly with the seal surface thereof resting on the other dynamic seal of the inner member and with an axially extending spacer flange seated on a radially outer extent of the first sidewall shear surface; and sealingly securing the spacer flange to the radially outer extent of the first sidewall shear surface.

5. The method of claim 4, comprising forming of the inner member with a second oppositely facing surface having a second seal affixed thereto and extending axially therefrom into dynamic sealing relation with a flat annular seal surface formed by a portion of the second sidewall.

6. A method of forming, assembling and filling a viscous damper of the type including an annular housing assembly defining a viscous shear chamber having a clutch assembly disposed therein, the method comprising:

forming a first sidewall of the housing assembly with a radially outer portion having a flat annular surface defining a surface of the shear chamber, with a radially inner portion, and with an annular recess portion intermediate the outer and inner portions;

forming a second sidewall of the housing assembly with a flat annular surface defining another surface of the shear chamber, with an annular axially extending spacer flange disposed radially outward of a radially outer extent of the other surface, and with a radially inner portion;

forming the clutch assembly with a radially outer portion having oppositely facing flat annular surfaces, with a radially inner portion having oppositely facing sides and with an intermediate portion having at least one through opening therewith;

supporting the first sidewall on a support with the flat annular surface thereof facing upward and horizontal;

positioning the clutch assembly on the first sidewall with a dynamic seal interposed between the inner portion of the sidewall and a facing side of the clutch assembly inner portion;

injecting a predetermined volume of viscous liquid through the opening in the clutch assembly and into the annular recess portion;

positioning the second sidewall over the clutch assembly with a dynamic seal interposed between the inner portion of the second sidewall and the other facing side of the clutch assembly inner portion, and with the axially extending spacer flange seated on a radially outer extent of the first sidewall annular surface; and sealingly securing the spacer flange to the radially outer extent of the first sidewall annular surface.

* * * * *